US009065878B2

(12) United States Patent
Curry et al.

(10) Patent No.: US 9,065,878 B2
(45) Date of Patent: Jun. 23, 2015

(54) SYSTEM AND METHOD FOR PROVIDING A REMOTE VIRTUAL SCREEN VIEW

(71) Applicant: Owl Computing Technologies, Inc., Ridgefield, CT (US)

(72) Inventors: John Curry, New River, AZ (US); Ronald Mraz, South Salem, NY (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 306 days.

(21) Appl. No.: 13/742,902

(22) Filed: Jan. 16, 2013

(65) Prior Publication Data

US 2014/0089388 A1 Mar. 27, 2014

Related U.S. Application Data

(60) Provisional application No. 61/706,604, filed on Sep. 27, 2012.

(51) Int. Cl.
 *G06F 15/16* (2006.01)
 *H04L 29/06* (2006.01)
(52) U.S. Cl.
 CPC ...................................... *H04L 67/42* (2013.01)
(58) Field of Classification Search
 CPC ....................................................... H04L 67/42
 See application file for complete search history.

(56) References Cited

U.S. PATENT DOCUMENTS

| 5,703,562 | A | 12/1997 | Nilsen |
| 6,968,158 | B1 * | 11/2005 | Bhuta et al. ...................... 455/68 |
| 7,992,209 | B1 * | 8/2011 | Menoher et al. ................ 726/26 |
| 8,489,704 | B1 * | 7/2013 | Mendez ........................ 709/217 |
| 2003/0091000 | A1 * | 5/2003 | Chu et al. ....................... 370/230 |
| 2008/0310428 | A1 * | 12/2008 | Lei et al. ........................ 370/400 |
| 2010/0242075 | A1 * | 9/2010 | Vimpari et al. ................ 725/109 |

* cited by examiner

*Primary Examiner* — Wing F Chan
*Assistant Examiner* — Padma Mundur
(74) *Attorney, Agent, or Firm* — John S. Economou (57) ABSTRACT

A system for virtual screen view service, comprising a monitored computer platform, a monitoring computer platform, a server installed on the monitored computer platform, a client installed on the monitoring computer platform, and a one-way data link for unidirectional data transfer from the server to the client, wherein the server is configured to periodically collect screen image data from the monitored computer platform and send it to the client via the one-way data link, and the client is configured to process the image data received from the server via the one-way data link and cause it to be displayed on the monitoring computer platform. An alternative configuration is also disclosed for allowing a remote client to securely monitor the screen of a locally monitored computer platform via an intermediary server.

14 Claims, 9 Drawing Sheets

| ab] DestIP | REG_SZ | 192.168.0.18 |
| ab] DestPort | REG_SZ | 7602 |
| ab] HorizRes | REG_SZ | 1920 |
| ab] MaxPacketLength | REG_SZ | 30000 |
| ab] MulticastEnable | REG_SZ | FALSE |
| ab] ScreenRate | REG_SZ | 20 |
| ab] ServerName | REG_SZ | LENOVO-SERVER |
| ab] SloScanEnable | REG_SZ | FALSE |
| ab] SloScanRate | REG_SZ | 5 |
| ab] TxEnable | REG_SZ | TRUE |
| ab] VerticalRes | REG_SZ | 1080 |

FIG. 3

```
MBytes/Sec 0.39  Packets/Sec 28.00                                    [X]
┌─Address──────────────────────────────┐
│ Destination IP Address [192.168.0.125] Multicast ☐
│ Port Number            [7601]
│ Server Name            [LENOVO-SERVER]            Enable Transmit ☑
│ Max Packet Size        [30000]
└──────────────────────────────────────┘
┌─Scan Control─────────────────────────┐
│ Screen Scan Rate  [20]   milliseconds
│ Slow Scan Rate    [5]    seconds
│ Enable Slow Scan  ☐
└──────────────────────────────────────┘
┌─Screen Resolution────────────────────┐
│ Horizontal Resolution [1920]
│ Vertical Resolution   [1080]
│ [Get Current]
└──────────────────────────────────────┘
                                              [Quit] [Accept Changes]
```

SYSTEM AND METHOD FOR PROVIDING A REMOTE VIRTUAL SCREEN VIEW

CROSS-REFERENCES TO RELATED APPLICATIONS

This application claims the benefit of the filing data of U.S. provisional application Ser. No. 61/706,604, filed on Sep. 27, 2012.

FIELD OF INVENTION

The present invention relates generally to unidirectional data transfer. More particularly, the present invention relates to the collection of real-time screen images from one or more monitored computer platforms within segregated networks and to the transmission of the collected image data to monitoring computer platforms via a one-way data link.

BACKGROUND OF THE INVENTION

Protection of a computer or data network from undesired and unauthorized data disclosure, interception or alteration has been a perennial concern in the field of computer and network security. For example, firewall and anti-spyware software have been developed to address security concerns for computers and networks connected to the Internet and to protect them from possible cyber-attacks such as Trojan horse-type viruses or worms that may trigger undesired and unauthorized data disclosure by these computers and networks. However, for high security computer networks such as those used by government agencies and intelligence community and certain commercial applications, conventional network security devices such as firewalls may not provide sufficiently reliable protection from undesired data disclosure.

Alternative network security methods and devices based on unidirectional data transfer have been devised to address the network security concern. For example, U.S. Pat. No. 5,703,562 to Nilsen ("the '562 patent"), the content of which is hereby incorporated by reference in its entirety, provides an alternative way to address the network security concern. The '562 patent discloses a method of transferring data from an unsecured computer to a secured computer over a one-way optical data link comprising an optical transmitter on the sending side and an optical receiver on the receiving side. By providing such an inherently unidirectional data link to a computer/data network to be protected, one can eliminate any possibility of unintended data leakage out of the computer/data network over the same link.

Any data link that strictly enforces the unidirectionality of data flow is called a one-way link or one-way data link. In other words, in such links it is physically impossible to send information or data of any kind in the reverse direction. One-way data link may be hardware-based, software-based, or based on some combination of hardware and software.

Figure 1:
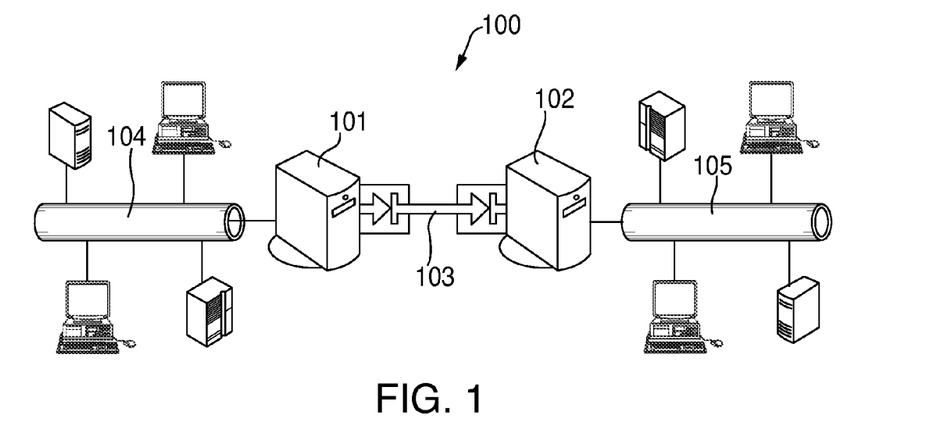
FIG. 1 schematically illustrates an example of a secure one-way data transfer system using a one-way data link.

One-way data transfer systems based on such one-way data links provide network security to data networks by isolating the networks from potential security breaches (i.e., undesired and unauthorized data flow out of the secure network) while still allowing them to import data from the external source in a controlled fashion. FIG. 1 schematically illustrates an example of one such one-way data transfer system 100. In the one-way data transfer system shown in FIG. 1, two computing platforms 101 and 102 (respectively, "the send platform" and "the receive platform") are connected to the unsecured external network 104 ("the source network") and the secure network 105 ("the destination network"), respectively. The send platform 101 is connected to the receive platform 102 by a one-way data link 103, which may be an optical link comprising, for example, a high-bandwidth optical fiber. This one-way optical data link 103 may be configured to operate as a unidirectional data gateway from the source network 104 to the secure destination network 105 by having its ends connected to an optical transmitter on the send platform and to an optical receiver on the receive platform.

A configuration such as the one shown in FIG. 1 physically enforces one-way data transfer at both ends of the optical fiber connecting the send platform 101 to the receive platform 102, thereby creating a truly unidirectional data transfer link between the source network 104 and the destination network 105. One-way data transfer systems based on a one-way data link are designed to transfer data or information in only one direction, making it physically impossible to transfer any kind of data, such as handshaking protocols, error messages, or busy signals, in the reverse direction. Such physically imposed unidirectionality in data flow cannot be hacked by a programmer, as is often done with firewalls. Accordingly, the one-way data transfer system based on a one-way data link ensures that data residing on the isolated secure computer or network is maximally protected from any undesired and unauthorized disclosure.

It has been found desirable to collect real-time screen images from a server screen in one network and display them on a client screen in another network in a secure manner, i.e., while maintaining the sanctity of the first network. Thus, it is an object of the present invention to facilitate collection of real-time screen images from the server platform in segregated networks and their transfer across a one-way data link to be displayed on the client platform without compromising the security of the segregated networks.

In a one-way data transfer configuration, which strictly enforces the unidirectionality of data flow from a server to a client, the client platform cannot provide any feedback or warning signal to the server platform. This could be problematic in the event of an overflow condition at the input buffer of the client platform: If the rate at which screen image data is collected and transmitted from the server platform to the client platform via a one-way data link is higher than the rate at which such data can be processed and displayed by the client platform, this would lead to an overflow condition at the client platform. However, the server platform cannot be made aware of this condition at the client platform and continues to transmit the screen image data to the client platform at the same rate. Hence, it is an object of the present invention to provide a way for the client platform to resolve, by itself, the potential overflow condition at its input buffer without sacrificing the display quality or the security of the segregated networks.

Other objects and advantages of the present invention will become apparent from the following description.

SUMMARY OF THE INVENTION

It has now been found that the above and related objects of the present invention are obtained in the form of a system for virtual screen view service.

More particularly, the present invention relates to a system for virtual screen view service, comprising a monitored computer platform, a monitoring computer platform, a server installed on the monitored computer platform, a client installed on the monitoring computer platform, and a one-way data link for unidirectional data transfer from the server to the client, wherein the server is configured to periodically scan the screen of the monitored computer platform and send, to the client via the one-way data link, a full screen update for the monitored computer platform at a re-synchronization rate and a partial screen update for the monitored computer platform at a screen scan rate, the screen scan rate being faster than the re-synchronization rate; the client is configured to process the full screen update and the partial screen update received from the server via the one-way data link and cause them to be displayed on the screen of the monitoring computer platform; and the server and the client are configured to communicate only through the one-way data link which strictly enforces the unidirectionality of data flow from the server to the client.

In addition, the present invention is also directed to a method of processing an input buffer for virtual screen view service, comprising the steps of periodically receiving a full screen update for a monitored computer platform via a one-way data link at a re-synchronization rate, periodically receiving a partial screen update for the monitored computer platform via the one-way data link at a screen scan rate, the screen scan rate being faster than the re-synchronization rate, and if the input buffer is not full, stacking the received full screen update and the received partial screen update into the input buffer, but if the input buffer is full, discarding the received partial screen update while waiting for the full screen update, emptying out the input buffer when receiving the full screen update, and stacking the received full screen update into the input buffer.

In a further embodiment, the present invention is a system for virtual screen view service, the system including a monitored computer platform having a server installed thereon, a local monitoring computer platform having a first client installed thereon, a one-way data link for unidirectional data transfer from the server to the first client, an intermediary server coupled to the first client via a first network connection; and a remote monitoring platform having a second client installed thereon, the second client coupled to the intermediary server via a second network connection. Preferably, the server is configured to periodically scan a screen of the monitored computer platform and send to the first client via the one-way data link (1) a full screen update for the monitored computer platform at a re-synchronization rate and (2) a partial screen update for the monitored computer platform at a screen scan rate, the screen scan rate being faster than the re-synchronization rate. Preferably, the first client is configured to transfer the full screen update and the partial screen update received from the server via the one-way data link to the intermediary server. Preferably, the intermediary server is configured to transfer the full screen update and the partial screen update received from the first server to the remote client. Preferably, the server and the first client are configured to communicate only through the one-way data link which strictly enforces the unidirectionality of data flow from the server to the client.

These and other features of this invention are described in, or are apparent from, the following detailed description of various exemplary embodiments of this invention.

BRIEF DESCRIPTION OF THE DRAWINGS

The above and related objects, features and advantages of the present invention will be more fully understood by reference to the following, detailed description of the preferred, albeit illustrative and exemplary, embodiments of the present invention when taken in conjunction with the accompanying figures, wherein.

DETAILED DESCRIPTION OF THE EXEMPLARY EMBODIMENTS

In the present disclosure, like reference numbers refer to like elements throughout the drawings, which illustrate various exemplary embodiments of the presently disclosed system. Although the presently disclosed system will be discussed with reference to various illustrated examples, these examples should not be read to limit the broader spirit and scope of the present invention.

Figure 2:
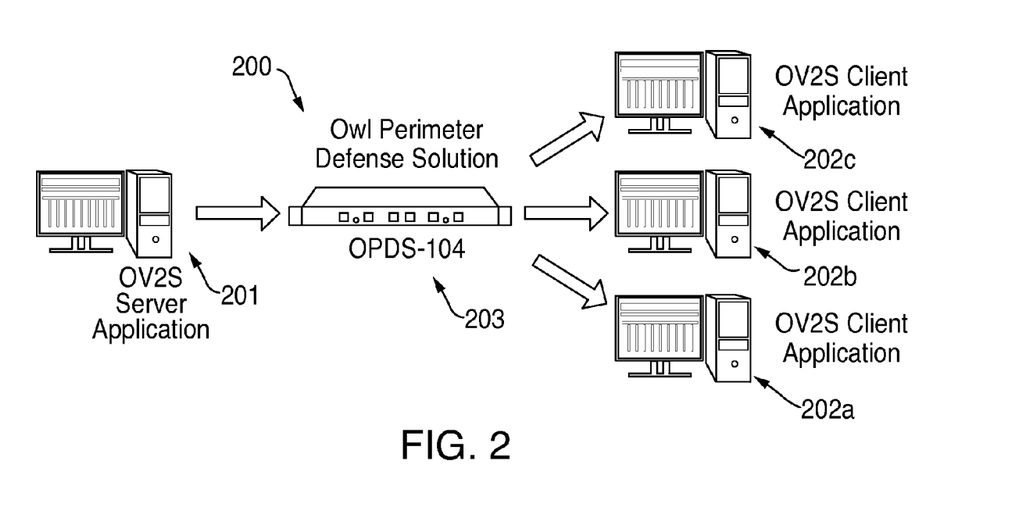
FIG. 2 is a diagram of an exemplary embodiment of the present invention.

Referring now to the drawings and in particular to FIG. 2, a first exemplary embodiment is shown in the schematic diagram of the Owl Virtual Screen View Service ("OV2S") system 200. The OV2S system collects real-time screen images from a computer platform (target server) to be monitored within segregated networks and send them to a client platform (remote server) outside the electronic perimeter via a one-way data link.

As further described below, the OV2S system is designed to allow delivery of high-quality images from a target server to a remote server at a controllable rate to minimize network impact. Such secure one-way transfer of screen content enables operators and administrators/maintenance staff in business or engineering networks to monitor activity, to troubleshoot systems, and to recommend process changes.

Figure 5:
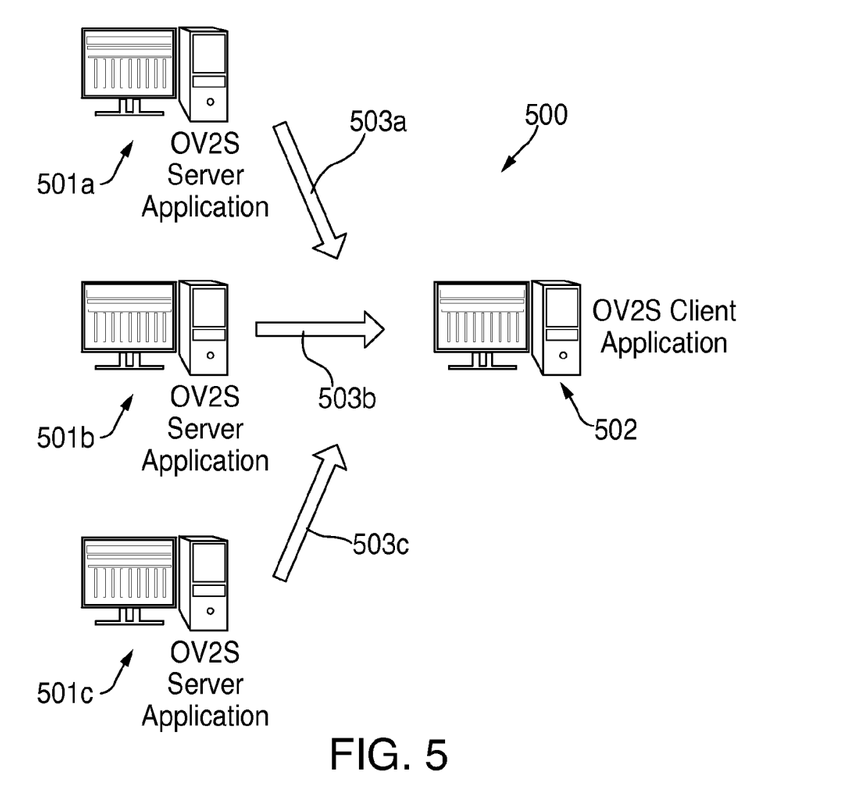
FIG. 5 is a schematic diagram of another exemplary embodiment of the present invention.
Figure 17:
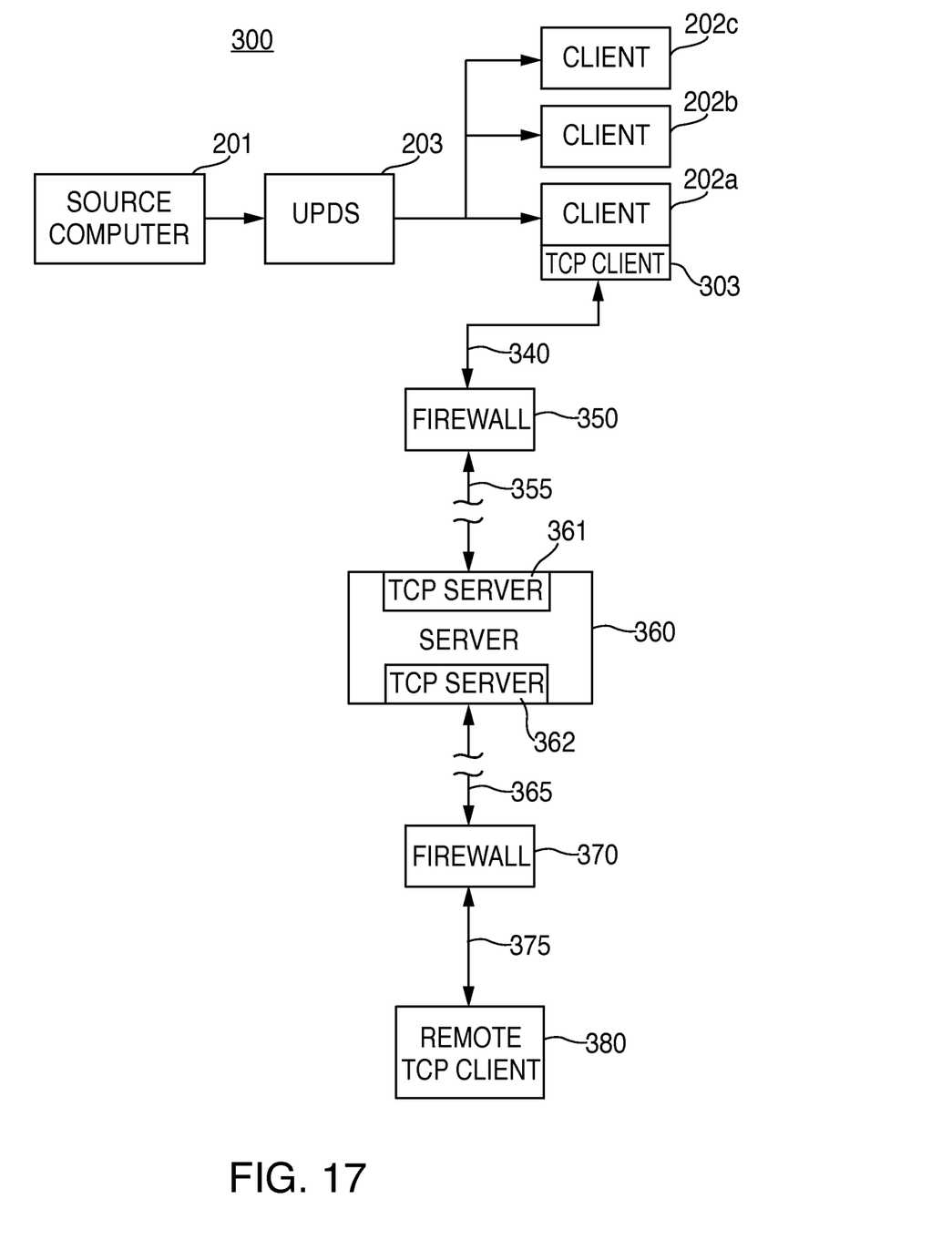
FIG. 17 is a block diagram of an alternative exemplary embodiment of the present invention.

The OV2S system can support multiple segregated network inputs and can deliver screen updates to unicast or multicast user destinations. As shown in FIG. 2, a single computer platform can be monitored by multiple client platforms. In one alternative embodiment (as shown in FIG. 5 and discussed below), multiple computer platforms can be monitored by a single client platform. In another alternative embodiment (as shown in FIG. 17 and discussed below), the monitoring computer platform may be positioned remotely and access to the single computer platform is obtained via a network, e.g., the Internet.

The OV2S server 201, which may be based on a software application, specially designed hardware, or some combination of both, is preferably installed on a computer platform (the OV2S server platform) to be monitored. Similarly, the OV2S client 202a, 202b, 202c, which likewise may be based on a software application, specially designed hardware, or some combination of both, is installed on a client platform (the OV2S client platform) for monitoring the OV2S server platform 201. For example, the software application used in the OV2S server and/or client may be written in C++ using Microsoft Visual Studio 2005, and its code design may be based on the Microsoft Foundation Class (MFC) libraries.

According to one or more embodiments of the present invention, a Microsoft Windows-based operating system (such as Windows Server 2003, Windows Vista, Windows Server 2008, Windows 7) is installed on each of the OV2S server and client platforms in the OV2S system. The versions of the Windows OS installed on the server and client platforms do not have to be the same. For example, the OV2S server may be running Windows Server 2008, while the OV2S client may be running Windows Vista.

As illustrated in FIG. 2, the OV2S server 201 may be connected to one or more OV2S clients 202a, 202b, 202c by a one-way data link 203, which strictly enforces the unidirectionality of data flow from the OV2S server to the OV2S client(s). In other words, the OV2S system communicates only in one direction, from the OV2S server 201 to the OV2S client 202, and the OV2S client 202 cannot transmit any data to the OV2S server 201. In such configuration, a single OV2S server platform's screen image can be sent to multiple OV2S clients.

As an example, FIG. 2 shows that the one-way data link 203 may be implemented in the form of an Owl Perimeter Defense Solution (OPDS) device. The OPDS device is designed to support one-way transfer of multiple data types and formats concurrently across a single compact, rack-mountable chassis. This easy-to-deploy OPDS integrates complete Send-only and Receive-only server engines connected via an embedded data diode and is based upon proprietary Owl DualDiode® Technology. The Send-only and Receive-only servers are connected via an internal fiber optic link operating at speeds ranging from 26 to 155 Mbps. Depending on user application bandwidth requirements, one OPDS may enable up to 32 simultaneous connections. As one of ordinary skill in the art will readily recognize, alternative conventional one-way data link devices may be substituted for the OPDS device within the spirit and scope of the preferred embodiments.

The OV2S server 201 is configured to capture the real-time screen images of the OV2S server platform and transmit them to the OV2S client 202 via the one-way data link 203. The captured screen image may be transmitted to the OV2S client as a series of UDP unicast or multicast packets. Upon receiving the captured screen image from the OV2S server 201, the OV2S client 202 stores the received image data in an input buffer (not shown) and reconstructs an exact image of the server screen on the display screen of the OV2S client platform.

According to one or more embodiments of the present invention, the OV2S system may be designed so that the OV2S client 202 can be stopped and re-started at any time, without the need to stop and re-start the OV2S server 201.

According to one or more embodiments of the present invention, the OV2S server 201 has multiple addressing modes such as IPV6, IPV4, Host Name Resolution, UDP Multicast and UDP Unicast.

According to one or more embodiments of the present invention, the OV2S server 201 is designed to scan its desktop screen periodically. The server screen is divided into multiple zones or sections (e.g., 160 zones) and all of the zones are scanned at a rate specified by the user ("the scan rate"). If a certain zone in the server screen has been changed, then the screen image for that zone is transmitted to the one-way data link 203 as a series of UDP packets.

According to one or more embodiments of the present invention, the OV2S server 201 may be further designed to re-synchronize the screen image at a regular interval ("the re-synchronization rate") so that the image of the entire screen is transmitted periodically (e.g., every 5 seconds). This is called full screen update at a re-synchronization rate.

Since the OV2S server 201 and client 202 are connected only by a one-way data link 203, which strictly enforces the unidirectionality of data flow from the server 201 to the client 202, there is no communication route from the OV2S client 202 to the OV2S server 201. Hence, the server 201 has no way of knowing the state of the client 202. In other words, for purposes of collecting and transmitting the screen image data, the OV2S server 201 does not know, nor does it need to know, whether the OV2S client 202 is actually powered on for operation or not. Since the OV2S server 201 re-synchronizes the screen image at a regular interval, upon startup, the OV2S client 202 needs to wait at most the maximum of the re-synchronization period (e.g., five seconds) before it can receive the screen image from the OV2S server 201 and start displaying the image on its display screen.

Figure 3:
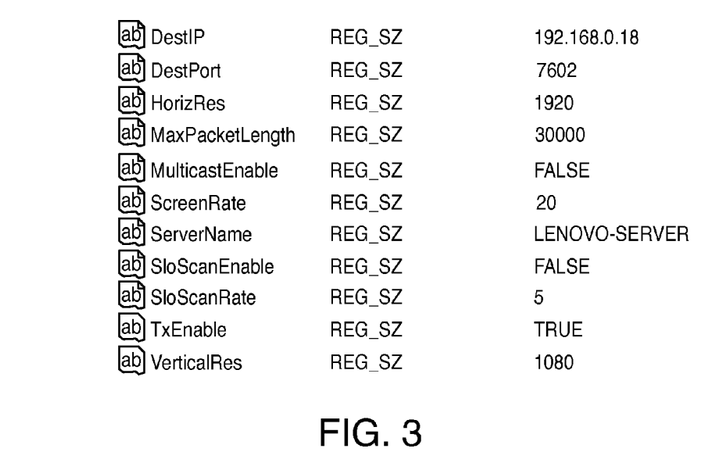
FIG. 3 shows an exemplary set of registry keys for the OV2S server.

For exemplary embodiments implementing the OV2S server 201 based on the Windows operating system, all setup and configuration parameters used by the server 201 may be stored directly into the Windows registry. An exemplary set of the registry keys for the OV2S server is listed in FIG. 3. Registry entries for the OV2S server may be stored under the following:

HKEY_CURRENT_USER\
Software\Owl Applications\OwlRemViewServer\ServerParams

According to one or more embodiments of the present invention, the OV2S server 201 may operate in either a normal scan mode, or a slow scan mode. The OV2S server operating in the normal scan mode captures a screen image at a rapid screen scan rate (e.g., in the range of milliseconds), which may be either pre-set or specified by the user. For example, a screen scan rate may be set at 60 milliseconds. As another example, the screen scan rate of as fast as 20 milliseconds can be used. It is noted that the normal scan mode at such a fast refresh rate can generate a large amount of data. In particular, if there are a lot of changes on the screen in a small amount of time, as for example might happen in playing video, data rates of several megabytes can easily be reached. Therefore, reducing the screen scan rate can dramatically decrease the amount of bandwidth used by the OV2S server.

In the normal scan mode, the OV2S server scans all of the multiple zones (e.g., 160 zones) of the screen at the screen scan rate and examines each zone for any change by comparing the newly scanned data with the previous data for each zone. If the OV2S server detects a change in image data for a certain zone, then the new image data for that zone is transmitted to the OV2S client 202 via the one-way data link 203 as one or more packets (e.g., UDP packets). This is called partial screen update at a screen scan rate.

As discussed above, the OV2S server 201 can also be configured to re-synchronize the screen image (i.e., transmit the content of the entire screen or full screen update) at a re-synchronization rate. Typically, the re-synchronization rate is much slower (e.g., every 5 seconds) than the screen scan rate (e.g., every 60 milliseconds). In this case, between the re-synchronization intervals, the OV2S server 201 broadcasts to the OV2S client 202 image data for the segments of its screen that have experienced image changes during the interval (i.e., partial screen updates). The rate of data transmission from the OV2S server depends on its screen activity. A server screen with a lot of activities (e.g., a video file) will likely generate a high rate of data transmission.

The OV2S server 201 may also operate in the slow scan mode. In the slow scan mode, the OV2S server captures and transmits the entire screen image at a rate (e.g., in seconds), which is either pre-set or specified by the user. The slow scan rate is typically much slower than the screen scan rate for the normal scan mode, and can be used for the server screens that do not change frequently. By using the slow scan mode for such screens, a considerable amount of network bandwidth can be conserved.

Figure 4:
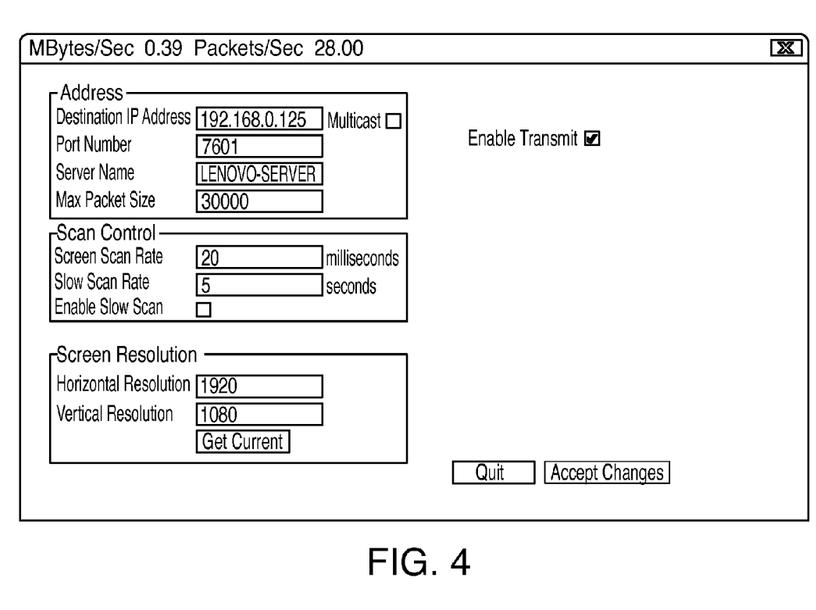
FIG. 4 shows an exemplary set up screen for the OV2S server.

FIG. 4 shows an example of the OV2S server set up screen (or server configuration menu) that allows the user to set the screen scan rate and the slow scan rate in the Scan Control panel. The header of the screen shows the current data rates in mega-bytes (MB) per second and packets per second.

According to one or more embodiments of the present invention, the screen image data collected by the OV2S server 201 may be compressed before being transmitted to the OV2S client 202 over the one-way data link 203. For example, a single-pass RLE (Run Length Encoder) algorithm may be used by the OV2S server to compress the screen image data. Using the corresponding algorithm, the OV2S client 202 decompresses the screen data received from the OV2S server 201.

Network routers commonly limit the packet size on the network as a precaution against malicious attacks. Accordingly, the OV2S server 201 may be configured to support a user-defined limit on packet size (e.g., 20K-60K bytes in length) in order to prevent packet blocking by router logic. Since it is more efficient to transmit larger packets than a large number of smaller packets, the OV2S server may be configured to pack compressed image data for as many screen zones as it can into a packet before transmitting it to the OV2S client.

The OV2S client is configured to listen for packets on a given port. However, there may be no guarantee that the corresponding OV2S server is the only one sending data on that same port. To further enhance the security of transmitting UDP packets from the OV2S server to the OV2S client, a number of possible measures can be implemented in the OV2S system 200 to uniquely identify a given packet for the OV2S client.

According to one or more embodiments of the present invention, each UDP packet formatted and sent by the OV2S server has a header entitled "msgHeader" at the beginning of the packet in the following format:

```
typedef struct msgHeader
{
    GUID       OwlScreenID;
    GUID       sessionID;
    int        iLen;
    int        iNumBlocks;
    int        CursorX;
    int        CursorY;
    enMsgType  enType;
    int        iSeqNumber;
}msgHeader;
```

The "OwlScreenID" is a 128-bit GUID (Globally Unique Identifier) specific to the OV2S system. This GUID (e.g., "0x4df0623f, 0x1465, 0x462f, 0x81, 0xe7, 0xbd, 0xe1, 0x84, 0x1, 0x9a, 0xbe") identifies the packet as being of type OV2S.

The "sessionID" is another 128-bit GUID that uniquely identifies the current session from the OV2S server. When the OV2S client is initiated, it waits for an initialization packet from the OV2S server before processing any screen image data, such as video data. The header for the initialization packet, as shown above, includes the current "sessionID" for the OV2S server. Once the initialization packet has been received, the OV2S client will reject any UDP packets that do not have a matching session ID. For example, if two servers inadvertently send data to the same IP address and the same socket, the OV2S client would reject the data from the server that does not have the matching session ID.

"iLen" identifies the overall length of the packet, and it must match the actual length of the packet received by the OV2S client. If it does not, the OV2S client will reject the packet.

"iNumBlocks" identifies the number of data blocks contained in the packet. If this is a video data packet, there will be some number of compressed video regions in this packet.

Every packet sent by the OV2S server identifies the current cursor position (e.g., "CursorX" and "CursorY" as shown above). The OV2S client then uses this information to position the cursor on the display screen of the client platform. This is much more efficient than sending a separate message from the server to the client with the cursor position.

In one or more embodiments of the present invention, it is not necessary to send information relating to the characteristics (e.g., shape, size, etc.) of the cursor of the OV2S server platform's display screen to the OV2S client. Instead, the OV2S client may use a custom shape to represent the cursor of the OV2S server platform. In addition, the shape for the client cursor may be made distinct from the standard Windows cursor.

"enType" is an enumerated parameter identifying the type of data contained in the packet. For example, the allowed data types may include:

| | |
|---|---|
| enmVersionPacket: | Packet contains Version Information |
| enmScreenData: | Packet contains Screen Data |
| enmUpdateDone: | Last video packet in current update series |

Each packet sent from the OV2S server is assigned a sequence number, "iSeqNumber," that is one higher than the sequence number for the previous packet. In this way, the OV2S client can determine if any packets from the OV2S server have been dropped in transmission.

According to one or more embodiments of the present invention, each UDP packet consists of a certain number of screen data blocks. Each of those blocks in the packet may also have a "msgHeader" as well, which uniquely identifies that block.

Each screen data block may include an additional header that defines the size and location of that block in reference to the start of the screen image. The screen data block header may include the following information:

| int | length: | Compressed length of the block |
|---|---|---|
| int | lengthUncomp: | Uncompressed length of the block |
| int | iOffset: | Offset, in bytes, from the start of the video buffer |

The "lengthUncomp" parameter in the screen data block header sent by the OV2S server identifies the length of an uncompressed block. When the OV2S client feeds the received screen image data into a decoder (e.g., RLE decoder) to de-compress the compressed block, the length of the resulting uncompressed block must match the "lengthUncomp" parameter. If it does not match, the OV2S client rejects the corresponding block.

The "iOffset" parameter identifies the position of the screen image data in the block relative to the start of the server screen image that the OV2S client is to reconstruct on the display screen of the client platform.

According to one or more embodiments of the present invention, the OV2S server 201 re-synchronizes the server screen image (e.g., at every 5 seconds) by first sending the "Version Packet," followed by a complete refresh of the screen. Upon startup, the OV2S client 202 waits to receive the Version Packet from the OV2S server 201 before processing any received screen data packets. The OV2S client needs the information in the Version Packet before interpreting and processing the screen data from the OV2S server. One exemplary structure of the Version Packet is as follows:

```
typedef struct msgInfo
{
        char szVersion[128];
        char szServerName[256];
        int iScreenWidth;
        int iScreenHeight;
        unsigned short bitsPerPixel;
        unsigned short colorDepth;
        unsigned short redMax;
        unsigned short greenMax;
        unsigned short blueMax;
        unsigned short redShift;
        unsigned short greenShift;
        unsigned short blueShift;
}msgInfo;
```

The OV2S client may use the information contained in the Version Packet to interpret and process the screen data received from the OV2S server. For example, the OV2S client may use the width, height, pixel count and color information included in the above exemplary Version Packet when it scales and translates the received server screen data into the current resolution and screen size on the OV2S client.

The "szVersion" in the Version Packet is a character string identifying the software version of the OV2S server. It must match the current software version of the OV2S client. If the software versions of the OV2S server and client do not match, the OV2S client may be configured to display a message showing the version mismatch. In this case of version mismatch, the OV2S client will not process any video data from the OV2S server.

The "szServerName" is the name assigned to the OV2S server. By default, the OV2S server may fill out this field with the server name assigned by Windows. The OV2S client will then use this server name for its display screen corresponding to the OV2S server. Alternatively, the end user can define a name for the OV2S server.

According to one or more embodiments of the present invention, the OV2S client may support concurrent connections to multiple OV2S servers so that multiple OV2S server platform screens can be monitored from a single remote OV2S client. For example, the OV2S client may be configured to support up to six concurrent server connections. FIG. 5 illustrates an exemplary embodiment of the OV2S system in which three OV2S servers 501a, 501b, 501c are connected to a single OV2S client 502 via their respective one-way data links 503a, 503b, 503c. Each potential server connection may have its own setup screen in the OV2S client platform.

Figure 6:
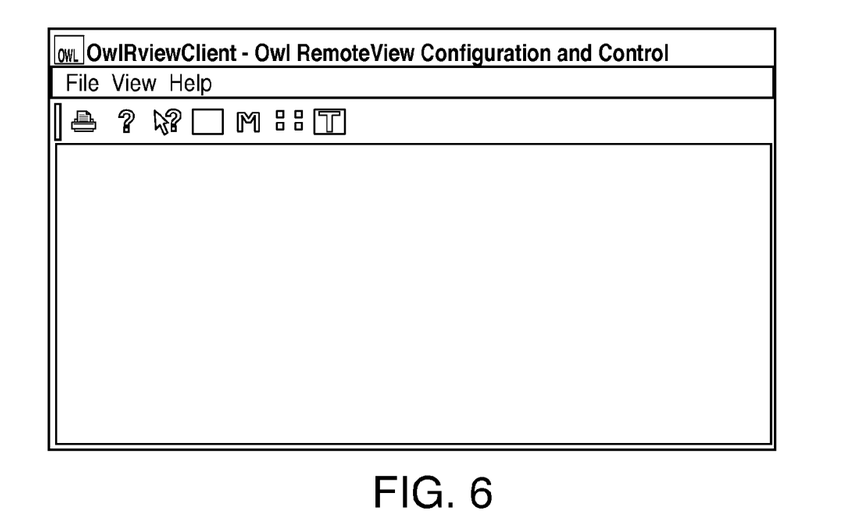
FIG. 6 shows an exemplary main setup screen for the OV2S client.
Figure 7:
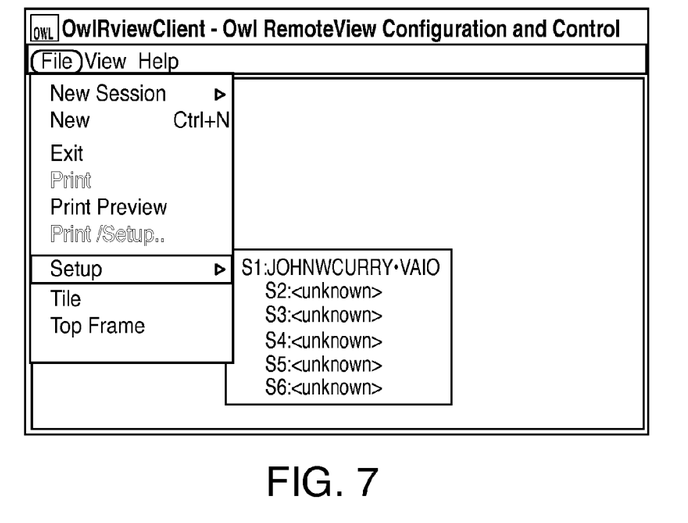
FIG. 7 shows an exemplary setup selection menu for the OV2S client.
Figure 8:
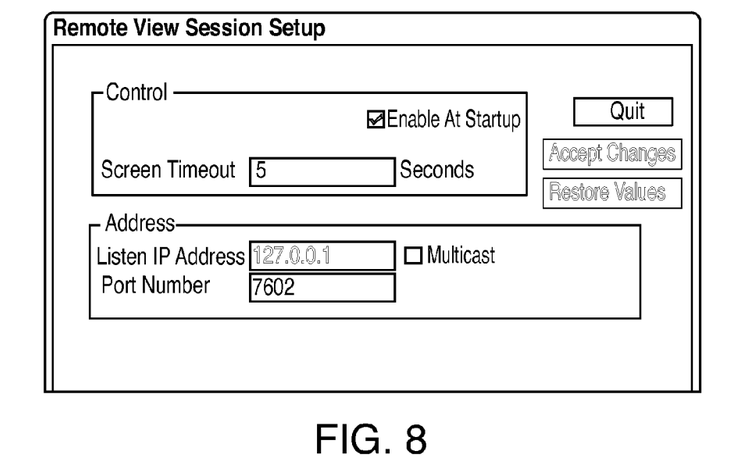
FIG. 8 shows an example of actual setup screen at the OV2S client for each OV2S server.
Figure 9:
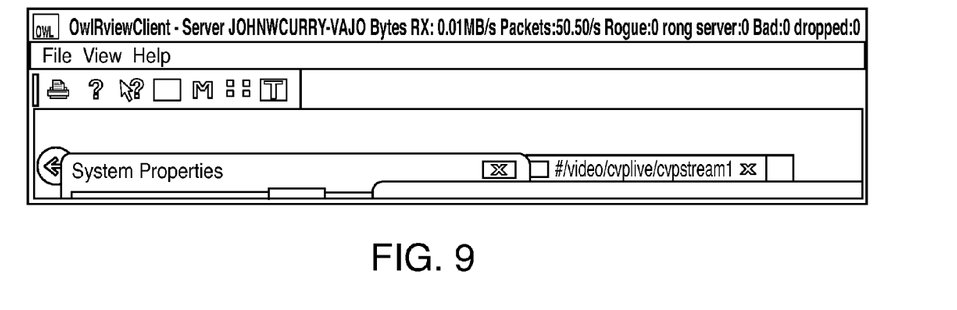
FIG. 9 shows an exemplary client window for the OV2S client, displaying the current status of the server connection.

FIG. 6 illustrates an exemplary main setup screen (RemoteView Configuration and Control Screen) that the OV2S client may display upon initialization. From this client main setup screen, the user may select the "File" and then "Setup" menu, as shown in FIG. 7, to select the setup screen for the desired session with a particular OV2S server. As an example, FIG. 7 shows that up to six possible concurrent connections with OV2S servers (indicated by S1, S2 . . . S6) may be allowed. If the name of the server connection is known, it is displayed (e.g., "S1:JOHNWCURRY-VAIO" as shown in FIG. 7). On the other hand, if the name of the server connection is unknown, then the connection is displayed as "<unknown>." FIG. 8 illustrates an exemplary actual setup screen (Remote View Session Set Up Screen) displayed on a client platform for setting up a session with an OV2S server. FIG. 9 shows an exemplary client window displaying the current status of the selected server connection.

According to one or more embodiments of the present invention, the OV2S client may be configured for auto start upon program startup.

According to one or more embodiments of the present invention, the OV2S client application is executed as a series of concurrent threads. Threads are sections of code or executable object that run concurrently. In a single processor system, the CPU performs fast context switching to change from one thread of execution to another. In a multi-core or multi-processor computer, on the other hand, the threads may execute simultaneously. Each server connection from the OV2S client spawns a separate servicing thread of execution. This thread is responsible for updating the client window assigned to the connected OV2S server. Each servicing thread spawns, in turn, a Communications Thread (also called Input Thread) to handle, filter and process incoming packets (e.g., UDP packet traffic) from the OV2S server.

As each packet is received from the OV2S server, it may be checked for validity by the Communication Thread. According to one or more embodiments of the present invention, the Communication Thread may extract the msgHeader at the beginning of the packet to verify, for example, the OwlScreenID GUID and the overall length of the packet (e.g., "iLen").

In addition, if the Version Packet has been received by the OV2S client, then the Communication Thread may also verify the sessionID GUID and the software version of the OV2S server (e.g., "szVersion") from the msgHeader and the msgInfo extracted from the Version Packet. As discussed above, the sessionID guarantees that the packet being displayed represents the current active OV2S server. Every time the OV2S server initiates a session, it creates a unique GUID for that session. This prevents the case of having two OV2S servers, each on a different machine, inadvertently sending to the same OV2S client (i.e., having two OV2S servers sending to the same UDP address and port number). If the packet is rejected by the OV2S client based on these verifications, the ground for rejection may be tallied so that it can be displayed on the corresponding Client Window status bar, an example of which is shown in FIG. 9.

According to one or more embodiments of the present invention, the Receiver Thread (also called Video Thread) is the main control element of the OV2S client for processing incoming data from the OV2S server. The Receiver Thread gets data from the Communication Thread. The Receiver Thread is a state machine with the following states:

Initialization
Video Packet Processing
Timeout/Termination

During the initialization phase, the Receiver Thread of the OV2S client listens on the specified port for packets (e.g., UDP packets) from the OV2S server. An exemplary structure of each packet is described above. As discussed above, the OV2S client also waits for the Version Packet during the initialization phase before processing any screen data packets.

The Receiver Thread and the Communications Thread share a common stack. The Communications Thread of the OV2S client is responsible for receiving packets (e.g., UDP packets) from the OV2S server, and stacking those packets for processing by the Receiver Thread of the OV2S client. According to one or more embodiments of the present invention, the Communication (or Input) Thread stacks the received packets into an input buffer for the OV2S client.

As noted above, each packet (e.g., UDP packet) received from the OV2S server is stamped with a sequence number (e.g., "iSeqNumber" in the msgHeader of the packet). According to one or more embodiments of the present invention, if the Communications Thread of the OV2S client receives a packet out of sequence, it attempts to find the missing sequence location in the items currently stacked for processing in the Communications Thread/Receiver Thread stack. If it is able to find the missing location, the OV2S client will inject the packet into the stack at the proper location. If it is unable to find the missing location, the OV2S client adds the packet to the end of the stack, and calculates the number of packets that have been rejected and dropped. The number of dropped packets is displayed on the status bar at the top of the corresponding client window (see, e.g., FIG. 9).

The Video Thread asynchronously removes the stacked packets from the input buffer and places them on the display screen of the OV2S client. The rate at which the Video Thread is able to process the stacked packets in the input buffer may vary widely from computer to computer, since, for example, video processing is dependent upon the type of video hardware installed on the computer, as well as the speed of the computer itself. Therefore, it is possible that the OV2S server can transmit packets at a rate which, from time to time, exceeds the processing capability of the OV2S client. Under such condition, packets received from the OV2S server will be stacked into the input buffer for the OV2S client at a rate faster than the rate at which the OV2S client can process them.

A simple method of handling this condition would be to drop the incoming packets (e.g., video segment) if there is no room in the input buffer for the OV2S client. However, this would rapidly lead to a very mismatched screen image on the display screen for the OV2S client platform, which would be unintelligible to a viewer. Hence, such method is undesirable.

Furthermore, since the unidirectionality of data flow from the OV2S server to the OV2S client is strictly enforced by the OV2S system (e.g., through the use of a one-way data link or Data Diode as described above), there is no physical way for the OV2S client to provide any feedback or warning signal to the OV2S server. In other words, the OV2S client cannot tell the OV2S server to throttle its transmission of packets. Hence, it would be desirable to have the OV2S client handle this condition on its own, without depending on the OV2S server and without sacrificing too much the quality of the image displayed on the client screen or the security of the segregated networks.

According to one or more embodiments of the present invention, when the transmission rate of the OV2S server exceeds the processing capability of the OV2S client and the input buffer for the OV2S client becomes full, the Input Thread of the OV2S client is configured to set a flag indicating that a buffer full condition exists, and flushes or empties out the input buffer.

During the process of emptying the stack in the input buffer, the Receiver Thread checks to see if the Version Packet has been received from the OV2S server. If the Version Packet has not been received, the Receiver Thread checks the type of each packet being removed from the stack. On the other hand, if there is a Version Packet present in the stack, it is left in the stack so that re-synchronization can occur between the OV2S client and the OV2S server.

As discussed above, the OV2S server re-synchronizes/transmits the image of its entire screen periodically (e.g., every five seconds). If the input buffer full condition exists, the Input Thread of the OV2S client stops stacking incoming packets or video segments until it receives the re-transmission of the entire screen image from the OV2S server at the time of re-synchronization. Meanwhile, the previous intact screen image is held on display for the OV2S client. When the screen image re-transmission is received by the OV2S client, it is stacked into the input buffer, and normal video processing is resumed by the OV2S client.

In this way, even in the event of a buffer full condition, the display screen of the OV2S client is not subject to a discontinuous series of images (which, for example, might happen if incoming packets or video segments are simply dropped until more rooms become available in the input buffer). By using the above-described kind of input buffer processing, the OV2S client may be able to remotely display server screen images from which the user may detect a pause, but not a significant deterioration of the image quality.

Figure 10:
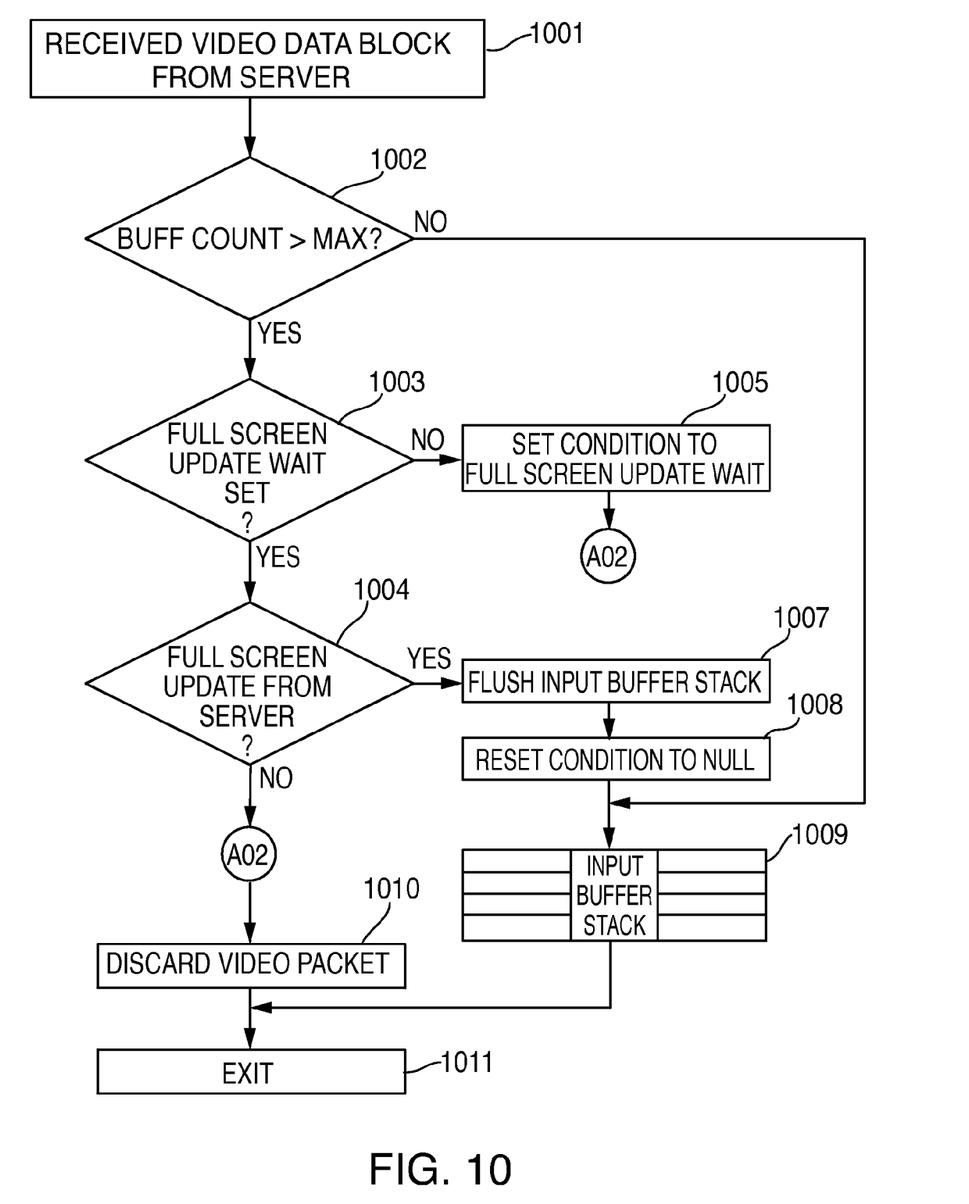
FIG. 10 is a flow diagram illustrating exemplary steps for the input buffer processing by the OV2S client.

FIG. 10 is a flow diagram illustrating exemplary steps of such input buffer processing by the OV2S client. In step 1001, the OV2S client receives a packet (e.g., video packet or video data blocks) from the OV2S server. In step 1002, the OV2S client determines whether there exists a buffer full condition at the input buffer. If not, i.e., if there exists more room in the input buffer, then the OV2S client stacks the received packet into the input buffer in step 1009 and exits the process in step 1011. On the other hand, if there exists a buffer full condition at the input buffer, then in step 1003, the OV2S client checks whether it is waiting for the full screen update, i.e., re-synchronization of the entire screen image. In one or more embodiments, this can be done by checking whether the condition has been set to full screen update wait. If the answer is no, then the OV2S client set the condition to the full screen update wait in step 1005, proceeds to discard the received packet in step 1010, and then exits the process in step 1011. If, on the other hand, the OV2S client is already in the full screen update wait mode (e.g., the condition has been set to the full screen update wait), then it checks whether it has received a full screen update from the OV2S server in step 1004. If it has, then the OV2S client flushes or empties out the existing stack present in the input buffer in step 1007, resets the condition to null (i.e., turns off the full screen update wait condition) in step 1008, stacks the received full screen update into the input buffer in step 1009, and exits the process in step 1011. If the OV2S client in step 1004 has not yet received the full screen update from the OV2S server, then it discards the received packet in step 1010 and exits the process in step 1011.

According to one or more embodiments of the present invention, the OV2S client processes video packets received from the OV2S server as follows. The Receiver Thread (or Video Thread) maintains an image of the screen buffer as it exists in the client. All video packets received from the OV2S server are, if compressed, decompressed, validated, and stored into the server screen buffer image at the offset, which is specified in, for example, the header portion of the screen data block in the incoming video packet as discussed above. However, the video packets are not processed to the display screen of the OV2S client at this time.

According to one or more embodiments of the present invention, the image data stacked into the input buffer represents a portion of the screen buffer image. If the screen buffer image is divided into multiple zones or sections (e.g., 160 zones), the input buffer would contain one or more of those sections from the OV2S server at any given moment.

According to one or more embodiments of the present invention, the OV2S server transmits video packets as a collection. The number of packets in that collection may vary based on the number of zones in the server screen that have changed during the current server screen refresh cycle. However, as noted above, the OV2S server periodically (e.g., every five seconds) re-synchronizes or transmits image data for all of the zones (e.g., 160 zones) in the entire server screen for a complete refresh.

According to one or more embodiments of the present invention, when the final video packet of the collection has been sent, the OV2S server sends an empty video packet to mark the end of the collection. When the OV2S client detects the end of the collection, the client screen associated with the OV2S server sending the video packets is prepared for update. The server screen buffer image is scaled and processed into the display screen of the OV2S client platform.

Figure 11:
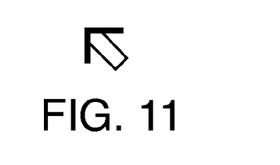
FIG. 11 shows an exemplary icon for the server cursor on the client screen of the OV2S client.

According to one or more embodiments of the present invention, the client screen is not allowed to update the display before an icon for the server cursor is added to the client screen. To avoid confusion with the local cursor of the client screen, the icon for the server cursor may have a unique design. An exemplary icon for the server cursor is shown in FIG. 11.

Normally, a client platform would receive a pixel map of the server cursor from a server platform, and has to conduct a separate and complex sequence to display the server cursor in the client screen. This sequence would include hiding the server cursor during screen updates, as well as protecting the area under the cursor during cursor movements.

According to one or more embodiments of the present invention, a much simpler approach may be taken to display the server cursor on the client screen: The server cursor is developed as an icon, which is never placed directly into the server screen buffer image. It is sent to the client screen buffer after the server screen buffer image is placed in the client screen buffer, but before the client screen buffer is actually drawn to the client screen area.

An exemplary set of sequence of steps for updating the display screen of the OV2S client platform after receipt of the end of collection of video packets from the OV2S server is as follows:

| | |
|---|---|
| Step 1 | Screen drawing is temporarily inhibited in the display screen of the OV2S client platform. |
| Step 2 | The client screen buffer for the OV2S client platform is updated with the latest server screen buffer image from in the input buffer. The input buffer contains either the partial screen update (i.e., changed segments of the server screen) from the OV2S server, or if the OV2S server has performed a complete screen refresh, the image data for the entire server screen. |
| Step 3 | The icon for the server cursor is drawn to the client screen buffer. |
| Step 4 | Screen drawing for the OV2S client is enabled. |
| Step 5 | A full client screen area update for the OV2S client platform is called. |

In this way, the entire client screen region for the OV2S client, including the server cursor, is updated only once. This is much more efficient than updating the client screen region for each individual video packet received from the OV2S server.

As discussed above and shown in FIG. 5, according to one or more embodiments of the present invention, the OV2S client may support concurrent connections to multiple OV2S servers. For example, the OV2S client may be configured to support up to six concurrent active server sessions. A client screen corresponding to each server session may be viewed on the display screen of the OV2S client platform as full screen, or reduced or resized as desired by the user.

Figure 12:
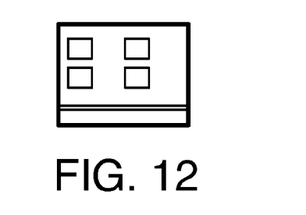
FIG. 12 shows an exemplary icon for the auto arrange function of the OV2S client.

According to one or more embodiments of the present invention, the OV2S client includes an auto arrange function that can be called from any client screen. For example, such function can be called by clicking on the exemplary icon shown in FIG. 12, which may be positioned at the top of each client screen. When this icon is clicked, the Screen Management logic of the OV2S client calculates the proper positioning of the OV2S client windows by taking into account, for example, the number of active OV2S client windows and the size of the OV2S client desktop. Based on this information, the Screen Management logic re-sizes each of the client windows, and re-arranges them on the client desktop.

Installation and configuration of exemplary embodiments of the OV2S server are further described as follows:

According to one or more embodiments of the present invention where the OV2S server is entirely or partially based on software application, the OV2S server may be installed on a computer platform to be monitored by the OV2S client and configured in a conventional manner.

According to one or more embodiments of the present invention, when the OV2S server application is executed, an OV2S server icon appears on the task bar on the server window. This icon can be right-clicked to show a menu with options for, e.g., (1) Settings, (2) Exit, (3) Messages, and (4) About. The "Exit" option in the menu may be selected to terminate the OV2S server application. To configure the OV2S server upon installation, the "Settings" option in the menu is selected to show the OV2S server configuration menu. An example of the OV2S server configuration menu is shown in FIG. 4.

In FIG. 4, the "Address" section of the OV2S server configuration menu specifies the IP address, port number, server name, and packet size to be used for the data transfer.

The "Destination IP Address" can be a name, an IPV4 address in standard dot notation or an IPV6 address. If multicast from the OV2S server is desired, the "Multicast" box in the configuration menu should be checked and a valid multicast address needs to be entered into the "Destination IP Address" field.

The port number also needs to be selected for the OV2S server to listen on.

The name entered into the "Server Name" field is used to identify the OV2S server. As described below, this name may be used in the "Setup" and "New Session" screens in the OV2S client.

As noted above, network routers can be configured to limit the allowable packet length in an effort to thwart network attacks. This can be done by entering a desired parameter in the "Max Packet Size" field to set the maximum packet size. For example, the valid range of the maximum packet size can be from 20,000 to 60,000. It is noted that a larger packet size increases the efficiency of the data transfer.

In FIG. 4, the "Scan Control" section of the OV2S server configuration menu is used to control the rate at which screen updates for the OV2S server platform are transmitted by the OV2S server. It is noted that a high scan rate (e.g., 20 milliseconds) can dramatically increase the amount of data sent by the OV2S server.

The "Screen Scan Rate" field sets the rate at which the OV2S server (in the normal scan mode) sends partial screen updates. It is noted that the OV2S server is typically configured to transmit a full refresh of the screen (or re-synchronize) at a rate (i.e., re-synchronization rate) much slower (e.g., every 5 seconds) than the "Screen Scan Rate" (e.g., every 20 milliseconds).

If the OV2S server is in a slow scan mode, it sends a complete screen snapshot at the rate specified in the "Slow Scan Rate" field. The slow scan mode can be activated by clicking on the "Enable Slow Scan" field and then specifying a rate (e.g., in seconds) in the "Slow Scan Rate" field. Slow scan mode is useful for transmitting screens that do not change frequently, since its network bandwidth usage is minimal.

The "Screen Resolution" section of the OV2S server configuration menu is used to define the resolution of the images being transmitted by the OV2S server. The current display configuration of the OV2S server (e.g., the actual screen resolution at 1,024×780 pixels) can be brought up by clicking on the "Get Current" button on the screen. In a preferred embodiment, the actual display configuration of the OV2S server is used to prevent scaling of the display before transmission. If the user keeps this configuration, then the display does not have to be scaled to some other user-defined resolution before transmission to the OV2S client. This may be preferable since it guarantees an exact replica of the screen on the OV2S client.

When the "Enable Transmit" box in the OV2S server configuration menu is checked, the OV2S server will start transmitting data.

Installation and configuration of exemplary embodiments of the OV2S client are further described as follows:

According to one or more embodiments of the present invention where the OV2S client is entirely or partially based on software application, the OV2S client is installed on a computer platform (e.g., a Level 2 Windows-based computer) for monitoring a target server (i.e., an OV2S server platform) and configured in a conventional manner.

According to one or more embodiments of the present invention, when the OV2S client application is executed, the RemoteView Configuration and Control Screen is brought up on the display screen of the OV2S client platform. An example of the RemoteView Configuration and Control Screen is shown in FIG. 6. This Configuration and Control Screen may be used to set communications defaults for multiple concurrent sessions (e.g., up to six concurrent sessions). All session control changes, as well as individual session launches, may be performed from this Configuration and Control Screen.

According to one or more embodiments of the present invention, configuration of the OV2S client can be initiated by clicking File>Setup><client machine> in the RemoteView Configuration and Control Screen, as shown in FIG. 7. In this example, the six screens are labeled S1-S6. If a connection has never been established, the description field will show <unknown>. Otherwise, the description field will reflect the user-defined name of the last OV2S server to which the session was connected (in this example, "S1: JOHNWCURRY-VAIO"). If S1 in the "Setup" menu of FIG. 7 is clicked on, the Remote View Session Set Up Screen will be brought up. An example of this Remote View Session Set Up Screen is shown in FIG. 8.

In FIG. 8, if the "Enable At Startup" box in the Remote View Session Setup Screen is checked, then this client connection will be initiated whenever the OV2S client is started.

The "Screen Timeout" field in the Remote View Session Setup Screen is used to specify the amount of time the OV2S client is to wait for data before closing the connection. Once a connection is established with the OV2S server, the OV2S client will close the connection if no data is received within the time frame specified in the Screen Timeout field.

The "Port Number" field in the Remote View Session Setup Screen specifies the port number on which the OV2S client is to listen for UDP traffic. If the "Multicast" box in the Remote View Session Setup Screen is checked, the OV2S client will listen for multicast UDP traffic at the IP address specified in the "Listen IP Address" field.

Figure 13:
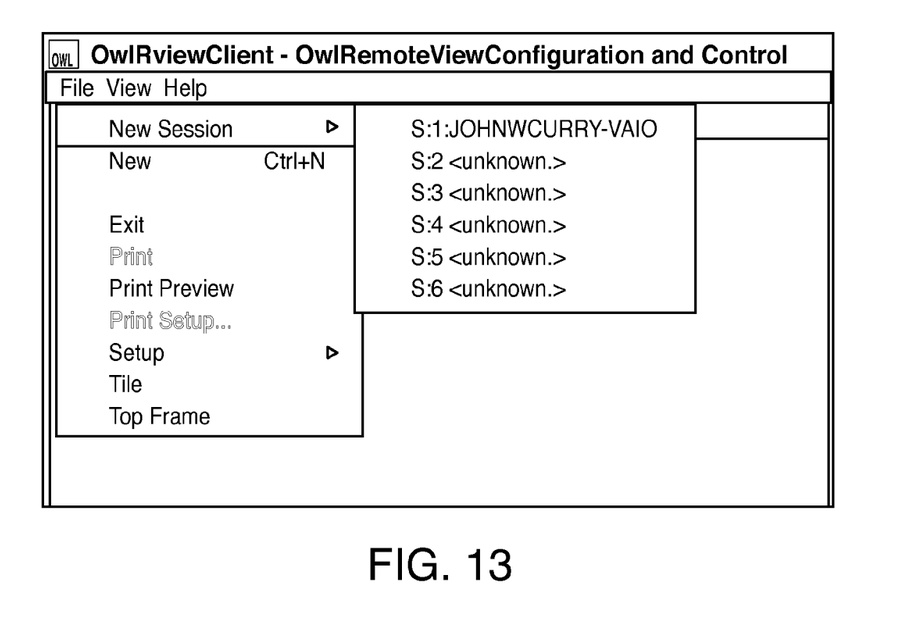
FIG. 13 shows an example of the client screen of the OV2S client for starting a new client session.

According to one or more embodiments of the present invention, a new session between the OV2S client and an OV2S server can be activated from the RemoteView Configuration and Control Screen (see, e.g., FIG. 6) by selecting File>New Session><client machine>, as shown in FIG. 13. In the "New Session" menu, options for the six screens are labeled S1-S6. If a connection has never been established, the description field will show <unknown>. Otherwise, the description field will reflect the user-defined name of the last OV2S server to which the client session was connected (in this example, "S1: JOHNWCURRY-VAIO").

Figure 14:
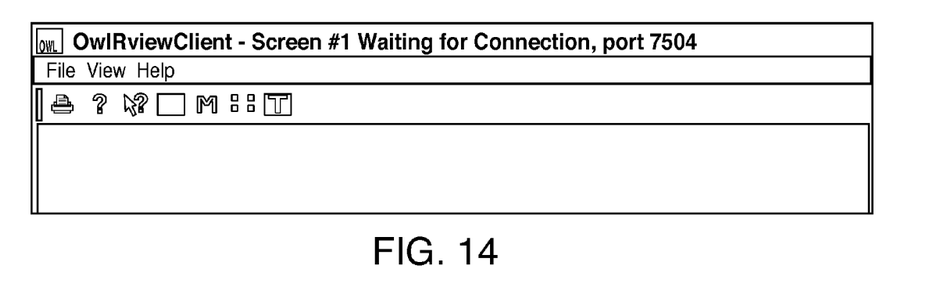
FIG. 14 shows an example of the initial client screen for the OV2S client.

In this example, when S1 in the "New Session" menu is clicked, the Initial Client Screen is displayed on the OV2S client platform. An example of the Initial Client Screen is shown in FIG. 14. The title bar at the top of the Initial Client Screen identifies the screen number (#1 in this example) and the port number (7504) to which the OV2S client is listening.

Figure 15:
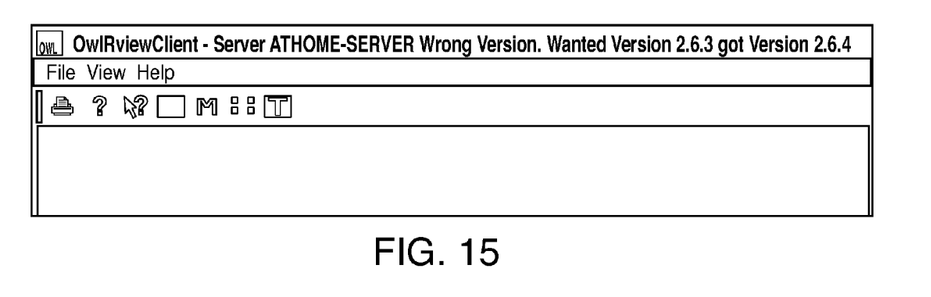
FIG. 15 shows an example of the client screen of the OV2S client displaying the OV2S version mismatch error message.

FIG. 15 shows that if there is a mismatch or incompatibility between the versions of the OV2S server and the OV2S client, the top of the Initial Client Screen will show an error message, and no screen data will be displayed.

Once a connection is established with the OV2S server, the Initial Client Screen (see, e.g., FIG. 14) will change to the Active Client Screen. An example of the Active Client Screen is shown in FIG. 9. The title bar at the top of the Active Client Screen displays specifics about the current connection, such as the name of the connected OV2S server (in this example, "JOHNWCURRY-VAIO"), as well as communication statistics as described below.

The "Bytes RX" field in the title bar at the top of the Active Client Screen displays the current incoming data rate in MB/sec.

The "Packets" field in the title bar at the top of the Active Client Screen displays the current incoming packet rate in packets per second.

According to one or more embodiments of the present invention, the UDP datagrams sent from the OV2S server to the OV2S client contain a header that defines the datagram being of type OV2S, and defines the current connection between the Server instance and this Client instance. If the OV2S client receives a UDP datagram that does not contain the proper OV2S header, then that datagram is considered rogue, and the "Rogue" count indicated in the title bar at the top of the Active Client Screen is incremented. This situation normally occurs when a UDP sender other than the OV2S server is sending datagrams to the address and socket number configured in the OV2S client.

When the OV2S server starts transmitting, it creates a unique ID for the current session. When the OV2S client receives the initial packets from the OV2S server, the OV2S client remembers that unique ID for that session. However, it is possible to have multiple OV2S servers (e.g., all in Level 3) that are all active at the same time. A common error is to have these multiple OV2S servers configured with the same UDP address and socket number. If more than one OV2S server send data to the same UDP address/socket, the OV2S client will receive data from both servers, but the data from one of the OV2S servers will be dropped. If this case arises, the "Wrong Server" count field in the title bar at the top of the Active Client Screen will increment for each packet received from the OV2S server with the wrong server ID, i.e., wrong sessionID GUID.

The "Bad" packet count field in the title bar at the top of the Active Client Screen displays the number of corrupted packets received by the OV2S client.

Each of the UDP datagrams sent from the OV2S server to the OV2S client may be configured to include a sequence number (e.g., iSeqNumber in the msgHeader of the UDP packet) so that the OV2S client can detect any packets dropped during transmission. The "dropped" packet count field in the title bar at the top of the Active Client Screen tracks the number of packets dropped during transmission.

According to one or more embodiments of the present invention, the Active Client Screen may provide the Client Task Bar Icons as a quick way to select different options for the OV2S client operation. As shown in FIG. 9, arrayed from left to right on the third row of the Client screen, exemplary Client Task Bar Icons may include: "Print Screen," "About," "Help," "Zoom/Scroll," "Messages," "Tile Windows," and "Open Configuration and Control."

The "Print Screen" icon is a standard Windows icon that opens a print settings screen, enabling the user of the OV2S client to set fonts, select a printer, etc.

The "About" icon is a standard Windows icon that displays information about OV2S (version, etc.).

The "Help" icon may be enabled to provide, for example, answers to the frequently asked questions about the OV2S system.

The "Zoom/Scroll" icon allows toggling between Zoom and Scroll modes. In Zoom mode, the Client screen is scaled to fit the window. The user can expand/contract the display by dragging the corner of the window with a mouse.

If there are more than one client screen active, the "Tile Windows" icon performs the tile or auto arrange function to arrange all of the client screens so that they can be made visible at once.

The "Open Configuration and Control" icon will open the Configuration and Control Screen (see, e.g., FIG. 6).

Figure 16:
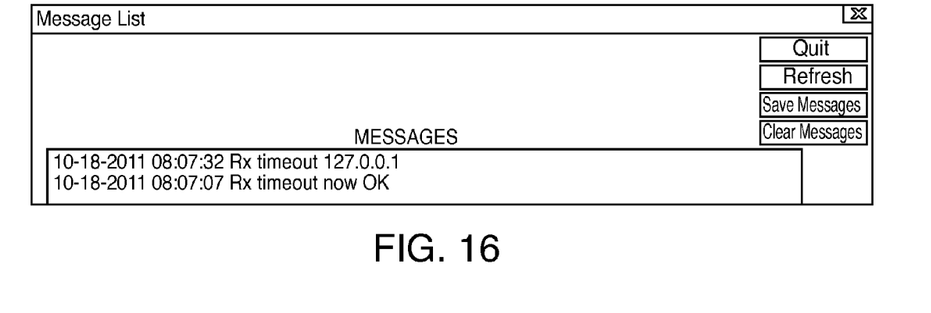
FIG. 16 shows an example of a Messages Dialog Box for the OV2S client.

The "Messages" icon will open a messages dialog box for the OV2S client, which displays event messages such as error messages and return-to-normal messages. For example, error messages may be displayed in red, and return-to-normal messages may be displayed in magenta. An example of the messages dialog box is shown in FIG. 16. The messages can be saved as text by clicking on the Save Messages button in the messages dialog box.

Referring now to FIG. 17, an alternative embodiment 300 is shown in which multiple local clients 202a, 202b, 202c may monitor a source client 201 (running an OV2S server) as discussed above with respect to FIG. 2 and a remote client 380 may also monitor OV2S server 201 via a remote connection (e.g., providing a secure cloud-based connection as discussed herein). In particular, one of the local clients 202a, 202b, 202c (e.g., 202a as shown in FIG. 17) may be configured to receive the UDP packets (either unicast and multicast) and, instead of (or in addition to) locally displaying them, may forward them via a TCP client 330 (which receives the UDP packets from the server 201 and converts the packets to TCP form for transmission) to a TCP server 361 in a remotely located server 360. In this configuration, TCP client 303 may be coupled first to an outward facing firewall 350 via a connection 340. Firewall 350 is, in turn, coupled to TCP server 361 via a network 355 (which may be a LAN, WAN or Internet connection, for example). Server 360 also includes a TCP server 362 and in operation forwards the TCP packets received on TCP server 361 to any remote client, e.g., remote TCP client 380, coupled to TCP server 362. Remote TCP client 380 is coupled to an intermediary server 360 via a connection 375 to an outward facing firewall 370, which in turn is coupled to a TCP server 362 via a network 365. As above with respect to network 355, network 365 may be a LAN, WAN or Internet connection, for example. Remote TCP client 380 is configured to receive and display the TCP packets in a manner similar to local clients 202a, 202b, 202c as discussed above. As one of ordinary skill in the art will readily recognize, system 300, when networks 355 and 365 consist of Internet connections, effectively provides a secure cloud-based solution for allowing a remote server 380 to monitor the screen of a source computer 201. In operation, remote client 380 operates identically with respect to processing and displaying the received packets as described above with respect to local client 202a, 202b, 202c.

While this invention has been described in conjunction with exemplary embodiments outlined above and illustrated in the drawings, it is evident that many alternatives, modifications and variations will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. A system for virtual screen view service, comprising:
    a monitored computer platform having a server installed thereon;
    a monitoring computer platform having a client installed thereon;
    a one-way data link directly coupled between the monitored computer platform and the monitoring computer platform for unidirectional data transfer from the server to the client,
    wherein:
    the server is configured to periodically scan a screen of the monitored computer platform and send to the client via the one-way data link (1) a full screen update for the monitored computer platform at a re-synchronization rate and (2) a partial screen update for the monitored computer platform at a screen scan rate, the screen scan rate being faster than the re-synchronization rate;

the client is configured to automatically receive and process the full screen update and the partial screen update received from the server via the one-way data link and cause them to be displayed on a screen of the monitoring computer platform;

the server is configured to transfer information to the client only through the one-way data link which strictly enforces the unidirectionality of data flow from the server to the client; and the monitored computer platform is coupled to the monitoring computer platform only via the one-way data link.

2. The system of claim 1, wherein the client is further configured to stack the full screen update and the partial screen update received from the server via the one-way data link into an input buffer before causing them to be displayed on the monitoring computer platform.

3. The system of claim 2, wherein:

the client is further configured to detect when the input buffer is full, and if the input buffer is full, the client is further configured to discard the partial screen update received from the server while waiting for the full screen update from the server, empty out the input buffer when receiving the full screen update, and stack the received full screen update into the input buffer.

4. The system of claim 1, wherein the server is configured to send to the client via the one-way data link the full screen update or the partial screen update in the form of one or more User Datagram Protocol (UDP) packets.

5. The system of claim 4, wherein the one or more UDP packets include a session identification (ID) that uniquely identifies a current session from the server.

6. The system of claim 4, wherein the one or more UDP packets include a screen identification (ID) for identifying the packets as being of a virtual screen view service type.

7. The system of claim 4, wherein the one or more UDP packets include a sequence number.

8. A system for virtual screen view service, comprising:

a monitored computer platform having a first server installed thereon;

a local monitoring computer platform having a first client installed thereon;

a one-way data link directly coupled between the monitored computer platform and the local monitoring computer platform for unidirectional data transfer from the first server to the first client;

an intermediary server coupled to the first client via a first network connection; and a remote monitoring platform having a second client installed thereon, the second client coupled to the intermediary server via a second network connection;

wherein:

the first server is configured to periodically scan a screen of the monitored computer platform and send to the first client via the one-way data link (1) a full screen update for the monitored computer platform at a re-synchronization rate and (2) a partial screen update for the monitored computer platform at a screen scan rate, the screen scan rate being faster than the re-synchronization rate;

the first client is configured to automatically receive and transfer the full screen update and the partial screen update received from the first server via the one-way data link to the intermediary server; the intermediary server is configured to transfer the full screen update and the partial screen update received from the first server to the second client;

the first server is configured to transfer information to the first client only through the one-way data link which strictly enforces the unidirectionality of data flow from the first server to the first client; and the monitored computer platform is coupled to the local monitoring computer platform only via the one-way data link.

9. The system of claim 8, wherein the second client is further configured to stack the full screen update and the partial screen update into an input buffer before causing them to be displayed on the monitoring computer platform.

10. The system of claim 9, wherein:

the second client is further configured to detect when the input buffer is full, and if the input buffer is full, the second client is further configured to discard the partial screen update received from the first server while waiting for the full screen update from the first server, empty out the input buffer when receiving the full screen update, and stack the received full screen update into the input buffer.

11. The system of claim 8, wherein the first server is configured to send to the first client via the one-way data link the full screen update or the partial screen update in the form of one or more User Datagram Protocol (UDP) packets and wherein the first client is configured to translate the full screen update or the partial screen update in the form of one or more UDP packets into Transmission Control Protocol (TCP) packets for transmission to the second client.

12. The system of claim 11, wherein the one or more UDP packets include a session identification (ID) that uniquely identifies a current session from the first server.

13. The system of claim 11, wherein the one or more UDP packets include a screen identification (ID) for identifying the packets as being of a virtual screen view service type.

14. The system of claim 11, wherein the one or more UDP packets include a sequence number.

* * * * *